United States Patent [19]

Paquin et al.

[11] 4,301,492
[45] Nov. 17, 1981

[54] PRESSURE-SENSING TRANSDUCER

[76] Inventors: Maurice J. Paquin, 8330 Stansbury St., Panorama City, Calif. 91402; James J. Radleigh, 2759 Harmony Pl., La Crescenta, Calif. 91214

[21] Appl. No.: 116,131

[22] Filed: Jan. 28, 1980

[51] Int. Cl.³ .............................................. H01G 7/00
[52] U.S. Cl. ..................................... 361/283; 73/718; 73/724; 361/272
[58] Field of Search .................. 361/283, 272; 73/718, 73/724

[56] References Cited

U.S. PATENT DOCUMENTS

| | | | |
|---|---|---|---|
| 1,993,560 | 3/1935 | Martin | 361/272 X |
| 3,697,835 | 10/1972 | Satori | 73/718 |
| 3,703,828 | 11/1972 | Bollard | 73/724 X |
| 3,858,097 | 12/1974 | Polye | 361/283 |
| 3,943,915 | 3/1976 | Severson | 361/283 X |
| 4,064,550 | 12/1977 | Dias | 361/283 |

*Primary Examiner*—Elliot A. Goldberg
*Attorney, Agent, or Firm*—Warren T. Jessup

[57] ABSTRACT

A pressure-sensing transducer comprised of a diaphragm sandwiched between two discs having substantially non-moving walls forming two adjacent chambers. Concentric electrodes on opposite faces of one of the chambers form a pair of capacitors. Ports are provided in the discs in communication with the chambers for application of fluid pressures. The transducer assembly is mounted in a housing and isolated from shock by fluid tubing supports attaching the ports on opposite sides of the assembly to the housing. The transducer can be formed of a plurality of discs and diaphragms in a sandwiched relationship to produce a family of transducers.

13 Claims, 6 Drawing Figures

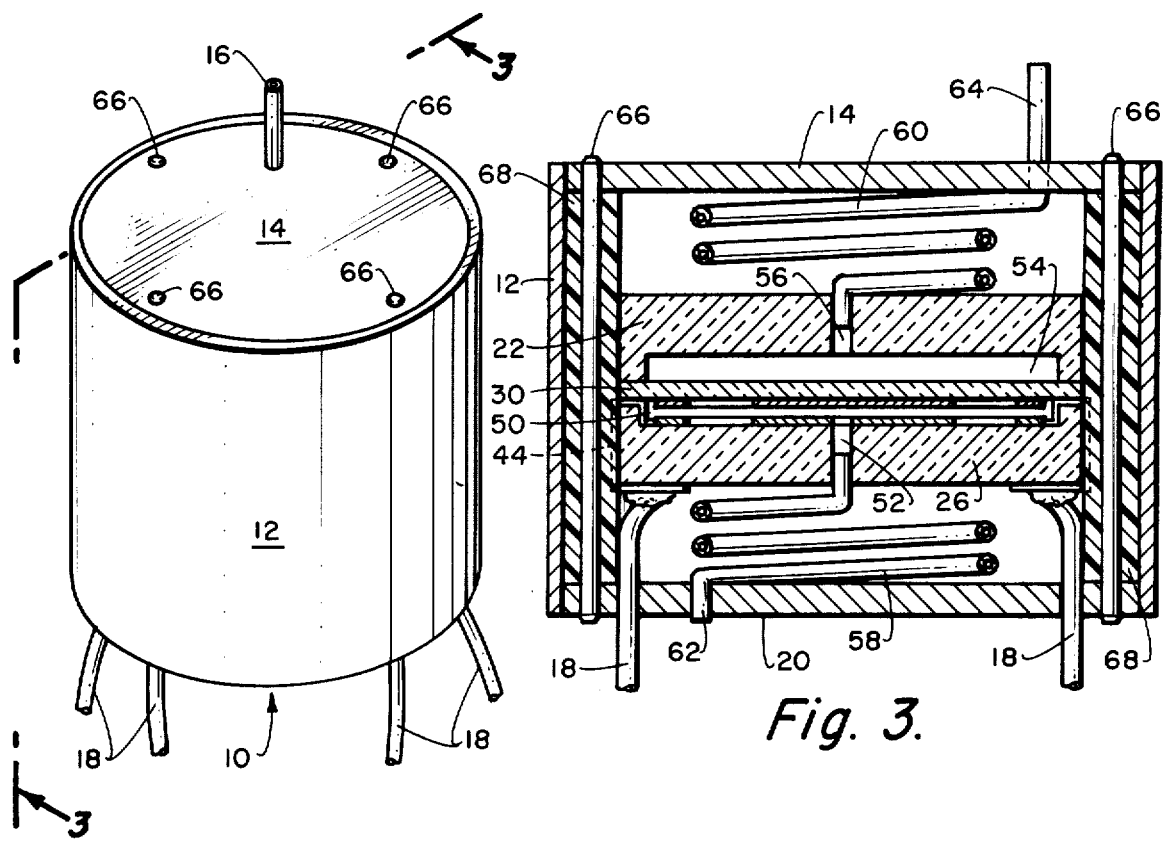
Fig. 3.
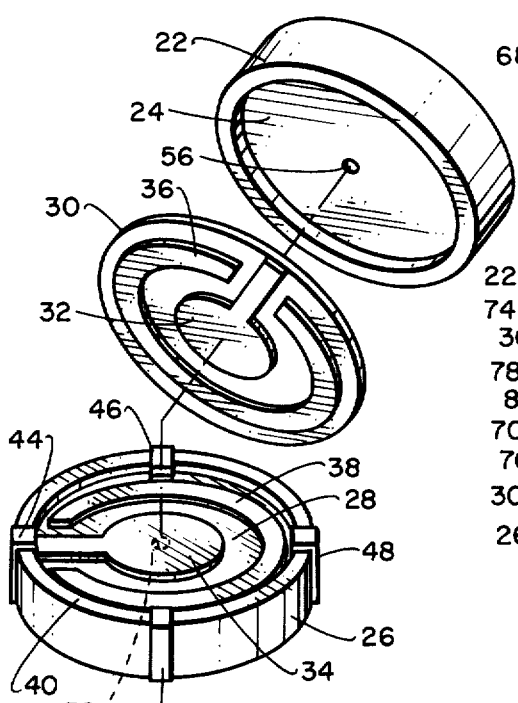
Fig. 1.
Fig. 2.
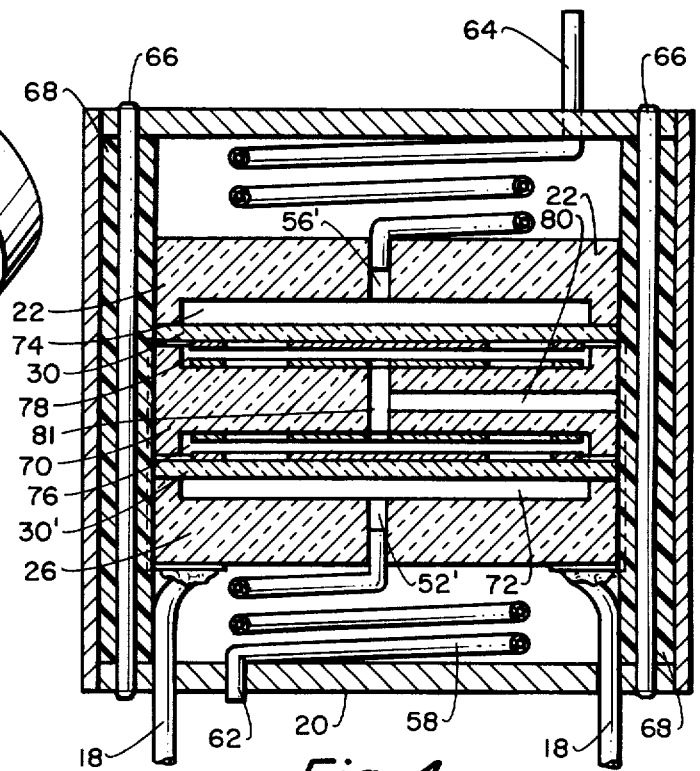
Fig. 4.

PRESSURE-SENSING TRANSDUCER

BACKGROUND OF THE INVENTION

This invention relates to pressure-sensing transducers of the capacitor type and more particularly relates to a transducer which can be used as a building block to create a family of transducers.

Capacitance-type pressure transducers are known. Among these are capacitor fluid pressure transducers which employ various electrodes to compensate for errors due to changes in temperature and other environmental factors. These transducers operate on the principle that the ratio of the capacitors formed by electrodes in the transducer remains substantially constant. The transducer is immune to changes in temperature or environment. These prior art devices provide capacitors on opposite walls of a hollow body and either utilize two moving walls with one of the electrode pairs being limited to the movable portion of the wall or employ a deflectable diaphragm with one of the electrodes being limited to the inflection area of the diaphragm. While effective, these transducers are not as sensitive as linear or as reliable as they could be.

SUMMARY OF THE INVENTION

The purpose of the present invention is to provide a transducer which provides temperature and environmental compensation but which is extremely sensitive to respond to fluid pressures, while also providing linearity and stability to build a family of transducers.

The present invention is comprised of one or more deflectable diaphragms sandwiched between a plurality of discs which have substantially non-moving walls. The diaphragms are sandwiched between the discs such that pairs of chambers are formed with each pair of chambers forming a single transducer. Thus, each transducer has a deflectable diaphragm having a chamber on either side over the transducer.

The discs have substantially non-movable walls and are provided with ports for fluid communication with each of the chambers in order to apply fluid pressures. Concentric electrodes are applied to opposite walls of one of the chambers to provide a pair of capacitors having a predetermined ratio. One of the capacitances serves as a reference capacitor for the electronics. Usually this is the outer electrode which is in the form of a ring, which functions as a reference point for nulling out such undesirable extraneous variables as the ring capacitances. Further, the ratio of the two capacitances is such that if a change in temperature causes a change in one capacitance, a corresponding proportional, if not equal, change will occur in the other capacitance. The chamber having the electrodes forming the capacitors is usually evacuated and the chamber on the opposite side of the diaphragm exposed to the fluid pressure to be measured.

The entire transducer assembly is then supported in a housing in a manner which isolates it substantially from the external influences, such as shock. The fluid ports in the outer substantially non-moving wall on the outer discs are used not only to supply fluid or evacuate the chamber, but also to provide shock mounting. This is accomplished by a helical or flexible conduit or tube attaching the port to the housing. Thus, the tube itself forms a shock-absorbing convoluted coil spring. The housing is held together by posts passing through the housing which also employ bumpers for eliminating translational shock movement of the transducer assembly.

It is one object of the present invention to provide a pressure-sensing transducer having a movable diaphragm formed between adjacent chambers for responding to fluid pressures.

Another object of the present invention is to provide a pressure acceleration sensing transducer which can be utilized as a building block to form a family of transducers.

Another object of the present invention is to provide a pressure acceleration sensing transducer which can be mounted in a housing to be isolated from shock.

Still another object of the present invention is to provide a pressure acceleration sensing transducer utilizing fluid supply tubes as shock-isolating mounts.

These and other objects of the invention will become apparent from the following detailed description when considered in conjunction with the accompanying drawings, wherein like reference numbers identify like parts throughout.

BRIEF DESCRIPTION OF THE DRAWINGS

FIG. 1 illustrates a pressure-sensing transducer mounted in a housing in perspective.

FIG. 2 is an exploded view of one embodiment of the pressure-sensing transducer of the invention, illustrating the formation of the electrodes.

FIG. 3 is a sectional view taken at 3—3 of FIG. 1.

FIG. 4 is a sectional view similar to FIG. 3 showing an alternate embodiment.

DETAILED DESCRIPTION OF THE PREFERRED EMBODIMENT

Figure 5:
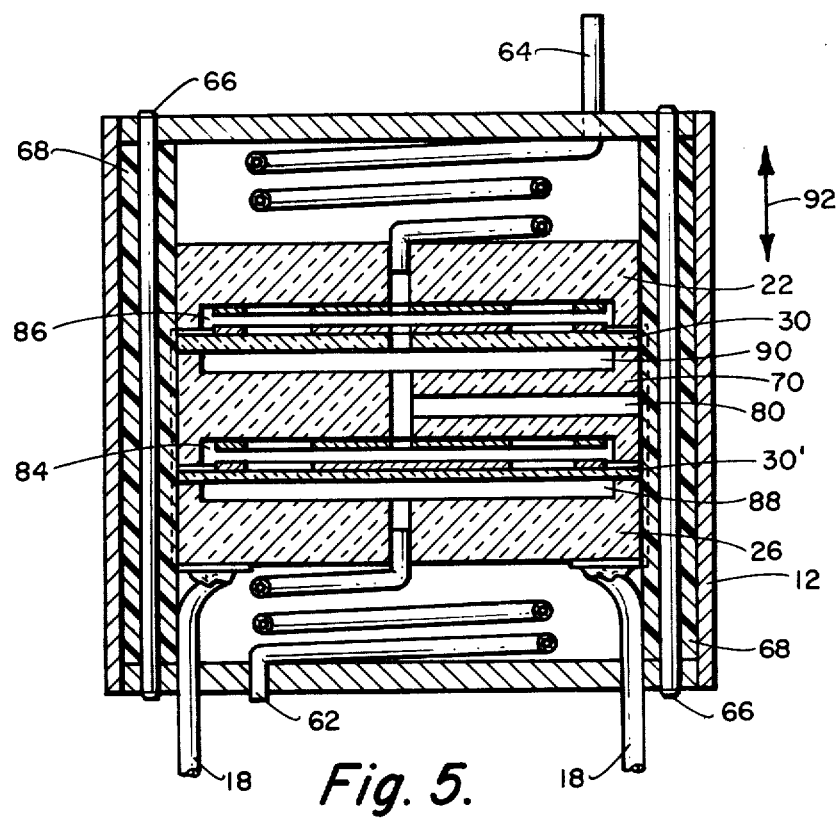
FIG. 5 is a sectional view similar to FIG. 3 showing another variation of the embodiment.

Referring to FIG. 1, there is shown a pressure-sensing transducer assembly generally indicated at 10, having a housing 12 with a top cover 14 and a fluid-connecting conduit 64. Electrical leads 18 exit through the bottom 20 of the housing, as shown in FIG. 3.

Mounted in the pressure-sensing transducer assembly 10 is a transducer as illustrated in FIG. 2. The basic transducer is comprised of a top disc 22 having a recess 24 and a bottom disc 26 having a recess 28. The discs 22 and 26 are substantially rigid or non-moving and preferably made of fused quartz because it is very resistant to contamination and is very stable, but other suitable materials besides quartz may be used. Sandwiched between the discs 22 and 26 is a diaphragm 30 which is sufficiently thin that it is easily deflected. Plated on the diaphragm 30 and in the recess of one of the discs (in this case recess 28 of disc 26) is a circular electrode 32 and a corresponding circular electrode 34 on the cooperative face of the disc 26. Circumjacent the circular center electrodes 32 and 34 are concentric ring electrodes 36 and 38, respectively. Terminal strips 42, 44, 46 and 48 are plated on the mating surface 40 and sides of the disc 26, as shown, to bring out the respective electrodes 32, 34, 36 and 38. The diaphragm 30 and the disc 26 are oriented as shown in FIG. 2 so that the respective leads are offset approximately 90°, so that there is no shorting of the leads as they emerge radially outward from the transducer.

The cylindrical chamber 50 (FIG. 3), formed between the disc 26 and the diaphragm 30, is typically evacuated through a port 52 through the center of the disc. The chamber 54 on the opposite side of the diaphragm 30 is provided with a fluid whose pressure is to be sensed through the inlet port 56. The ports 52 and 56 may also serve the dual purpose of providing a shock mounting for the transducer in the housing 12 to isolate the transducer from shock, as illustrated in FIG. 3. A suitable adhesive around the rims (i.e. mating surfaces) of the recesses 24 and 28 seals the entire unit.

The unit is then mounted in the housing by means of tubing 58 and 60, joined at one end to the ports 52, 56 respectively, and at the other end to the top 14 and bottom 20 of the housing 12. The tubing 58 and 60 preferably has at least one convolution to provide ample shock isolation between the housing and the transducer assembly. The ends of the respective tubing, 62 and 64, pass through the bottom and top of the housing and may be soldered or otherwise attached thereto. The chamber 50 is then evacuated through the tubing 58 and the tubing may then be sealed. The tubing 60 may then be employed to apply fluid pressure to the chamber 54.

Electrical leads 18 are appropriately soldered to the respective plated leads on the transducer and pass through the housing for connection to suitable electronics. In the alternative, the electronics could be within the transducer housing 12. The housing 12 is sealed with the top 14 and bottom 20 being clamped by rods 66. Resilient bumpers 68 are placed around each of the rods and are sufficiently large in diameter that they contact the outer periphery of the transducer assembly to provide additional shock isolation and limit translational movement.

In operation, the quartz diaphragm 30 is deflected in proportion to the magnitude of pressure applied to the port 56. This deflection brings the circular electrodes 32 and 34 closer together varying the capacitance between the electrodes which is then read out by a suitable electronic circuit. The ring electrodes 36 and 38 can serve as a reference point to null out undesirable external variables, such as ring capacitance and to served as a reference capacitance for the electronics.

As was indicated previously, this electrode also provides compensation for environmental temperature changes which cause a change in the capacitance corresponding, proportionally, if not equally, to the change which would occur in the capacitance between the other two electrodes. For this reason, it is preferable that the discs and diaphragm be constructed of quartz because it is very stable and electrodes are platinum which is also very stable. While this is desirable, it is not essential that the electrodes be made of platinum or that the entire device be made of quartz. There are other suitable materials besides quartz that might be used.

Any desired fluid, gas or liquid, which may be somewhat corrosive or contiminated, may be injected into the pressure chamber 54 through the port 56 without affecting the transducer, because the body of the transducer is made of materials which resist such contaminants. Further, the measurements are made in the chamber 50 which is sealed against this fluid and therefore is unaffected by any contaminating action of the fluid being sensed.

Another unique feature of the construction of the present invention is the ability to build a family of transducers utilizing the same principles. Thus, a family of transducers is illustrated in FIG. 4, comprised of two outer discs 22 and 26 and a center disc 70, between which two diaphragms 30 and 30' are mounted. In this embodiment pressure chambers are formed at 72 and 74, between the outer discs 22 and 26 and the diaphragms. The chambers 76 and 78 between the diaphragm and the center disc 70 have electrodes formed in the manner disclosed and described with respect to the transducer illustrated in FIG. 2. With the transducer constructed as shown in FIG. 4, we now have a multi-function transducer.

One function of this multi-transducer assembly is accomplished by evacuating chambers 76 and 78 through port 80, allowing two independent pressures to be applied to the chambers 72 and 74. This results in two absolute transducers having the same or different ranges. Different ranges may be provided by simply varying the thickness of the diaphragms of 30 and 30'. The capacitors in the respective transducers may also be connected electronically so that they can be made to subtract from one another.

The transducers shown in FIG. 4 can also be utilized for differential pressure measurement. When the chambers 76 and 78 are filled with an inert fluid through port 80 and pressure is applied to the chambers 72 and 74, the transducer assembly can now act as a sensitive ΔP transducer that can also withstand high absolute pressures on each pressure port while measuring small differential pressures between the two inport ports 52' and 56'.

For example, if 2000 psi is applied to chamber 72, this exerts a force on diaphragm 30'. This force is transmitted through passageway 81 to diaphragm 30. If 2000 psi is also applied to chamber 74, this applies a force on diaphragm 30 in opposition to the force from chamber 72. It also exerts a force on diaphragm 30' in opposition to the force applied to chamber 72. In this case the forces are equalized and diaphragms 30 and 30' assume positions equal to each other (zero pressure) and will respond to very small differential pressure. This transducer configuration also can be utilized to measure the difference in pressure of two different mediums such as a gas in chamber 72 and a liquid in chamber 74.

In the embodiment of FIG. 5, a multi-function transducer is formed as before of upper and lower discs 22 and 26 and center discs 70, between which diaphragms 30 and 30' are sandwiched. However, in this embodiment the electrodes forming the capacitors are in chambers 84 and 86 which are remote from each other. The transducers formed are therefore in a series-like configuration, with pressures being applied to chambers 88 and 90. In this configuration the transducer forms a substantially acceleration insensitive assembly. With chambers 84, 86 and 90 evacuated and pressure applied to chamber 88, the transducer becomes an absolute unit with the ability to cancel acceleration errors in the direction indicated by the arrow at 92. The respective transducers formed in the embodiment of FIG. 5 may also be made sensitive to different pressures by making the diaphragms thicker. For example, as shown in FIG. 5, the diaphragm 30 has a thickness twice that of diaphragm 30', making the transducer formed by diaphragm 30' twice as sensitive.

Figure 6:
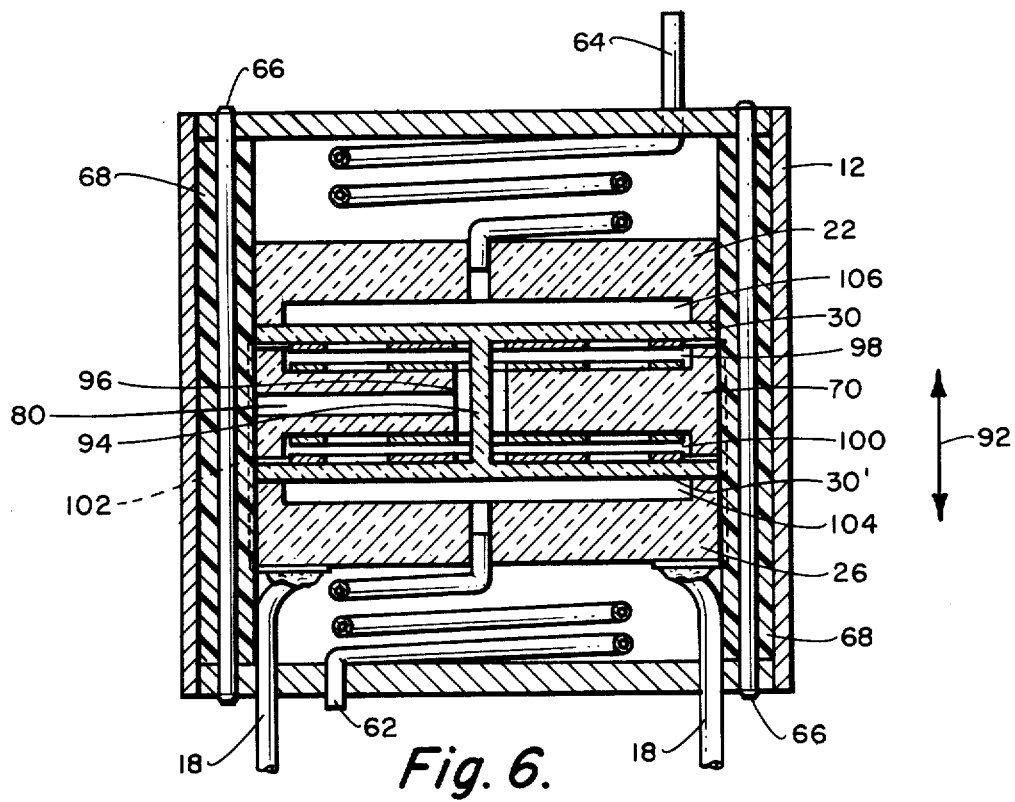
FIG. 6 is a sectional view similar to FIG. 3 showing an additional alternate embodiment of the pressure-sensing transducer.

The multi-transducer embodiment of FIG. 6 illustrates a modification which will allow the transducer assembly to measure extremely small differential pressures when the applied pressures are very high. This is accomplished by including a force-equalizing bar or post 94 which connects diaphragm 30 to diaphragm 30'.

The force-equalizing bar 94 connects the two diaphragms through the port 96 which is made sufficiently large to clear the bar. The adjacent chambers 98 and 100 may then be evacuated through port 80. With pressures applied to chambers 104 and 106 extremely small differential pressures may be measured because the force-equalizer bar 94 will provide movement towards diaphragm 30, which will be translated to diaphragm 30'.

If wall 70 is made sufficiently thin, such that under acceleration in the direction 92, it will deflect and cancel capacitance errors caused by diaphragm 30 and 30', moving in response to acceleration in direction 92, the device now becomes immune to the effect of acceleration.

Thus, there has been disclosed and described a unique pressure-sensing transducer and assembly system which is suitable to provide a multi-transducer system. The unique mounting system not only provides isolation from shock, but also the housing itself becomes a Faraday shield for the transducer. The pressure range of the family of transducers may be changed by simply varying the thickness of the diaphragm in the transducer. With the assembly disclosed and described, the transducer can be used as a building block to provide an extremely versatile family of transducers using interchangeable parts to provide units that can be measured absolute and differential pressures and summing pressures of varying gases and fluids, contaminated or not, in various combinations.

Obviously, many modifications and variations of the present invention are possible in light of the above teachings. It is to be understood, therefore, that the full scope of the invention is not limited to the details disclosed herein, but may be practiced otherwise than as specifically described.

What is claimed is:

1. A pressure-sensing transducer comprising:
   a first substantially rigid disc having a recessed face;
   a second substantially rigid disc having a recessed face;
   a flexible diaphragm sandwiched between said first and second discs forming first and second chambers;
   first electrode means on one side of said diaphragm;
   second electrode means on the wall of the recess opposite the electrodes on the diaphragm;
   a housing surrounding and enclosing the sandwiched assembly of first and second discs and flexible diaphragm; and
   means for connecting said first and second chambers to a source of fluid comprising flexible tubing adapted to isolate said assembly from external shocks.

2. The pressure-sensing transducer according to claim 1 wherein at least one of said electrode means comprises a pair of concentric electrodes matching the electrodes on the diaphragm.

3. The pressure-sensing transducer according to claim 2 wherein the area of the respective electrode means is equal.

4. The pressure-sensing transducer according to claim 1 including:
   a second recess on said second disc on the opposite face from the first;
   a third disc having a recessed face;
   a second diaphragm sandwiched between said second and third discs forming third and fourth chambers;
   third electrode means on one side of said second diaphragm;
   fourth electrode means on the face of the recess in the second disc opposite the electrode means on the diaphragm.

5. The pressure-sensing transducer according to claim 4 including a passageway through said second disc connecting the adjacent chambers in fluid communication.

6. The pressure-sensing transducer according to claim 4 wherein the chambers having the electrodes are remote from one another.

7. The pressure-sensing transducer according to claim 4 including:
   a rigid post joining said second diaphragm to said first diaphragm, whereby the displacement of said diaphragms is equalized.

8. A pressure-sensing transducer assembly comprising:
   a plurality of discs having recesses in one or more faces;
   at least one diaphragm being sandwiched between said discs whereby a plurality of chambers are formed;
   a pair of concentric electrodes on said at least one diaphragm;
   at least one electrode on the face of the recess opposite said pair of electrodes;
   housing means surrounding the sandwiched assembly of discs and diaphragms; and
   resilient conduit means for connecting said chambers to a source of fluid under pressure and for supporting said discs within said housing means and isolating said discs from shock applied to said transducer assembly.

9. A pressure-sensing transducer assembly in accordance with claim 8, wherein said conduit means is convoluted.

10. A pressure-sensing transducer assembly comprising:
    a plurality of discs having recesses in one or more faces;
    at least one diaphragm being sandwiched between said discs whereby a plurality of chambers are formed;
    a pair of concentric electrodes on said at least one diaphragm;
    at least one electrode on the face of the recess opposite said pair of electrodes;
    means connecting said chambers to a source of fluid under pressure;
    housing means surrounding the sandwiched assembly of discs and diaphragms; and
    a tubing formed in at least a partial helix supporting said assembly in said housing.

11. A pressure-sensing transducer assembly comprising:
    at least three discs having recesses in one or more faces thereof;
    at least two diaphragms sandwiched between said discs and forming at least four chambers;
    pairs of concentric electrodes on at least one diaphragm at least one electrode on the face of the recess opposite said pair of electrodes;
    housing means surrounding the sandwich assembly of discs and diaphragms; and resilient conduit means for connecting each of said chambers to sources of fluid pressure external of assembly.

12. A pressure-sensing transducer assembly comprising in combination two diaphragms and:
   three discs having recesses in one or more faces;
   a pair of concentric electrodes on each diaphragm;
   said two diaphragms alternating between said discs forming at least four chambers whereby electrodes are in chambers on opposite sides of the center disc;
   at least one electrode on each face of the recess of said center disc;
   housing means surrounding the sandwich assembly of discs and diaphragms;
   means connecting said chambers to a source of fluid under pressure;
   shock-isolating means supporting said assembly and said housing; and
   force-equalizing means for equalizing the force applied to the pair of diaphragms.

13. A pressure-sensing transducer assembly in accordance with claim 12 wherein said force-equalizing means comprises a rigid post passing through said center disc and joining said diaphragms for simultaneous movement.

* * * * *